United States Patent [19]

Howland

[11] 4,419,866
[45] Dec. 13, 1983

[54] TRANSPORT REFRIGERATION SYSTEM CONTROL

[75] Inventor: Leland L. Howland, Belle Plaine, Minn.

[73] Assignee: Thermo King Corporation, Minneapolis, Minn.

[21] Appl. No.: 386,500

[22] Filed: Jun. 9, 1982

[51] Int. Cl.³ .................. F25B 1/00; F25B 49/00; G05D 23/32
[52] U.S. Cl. .................. 62/228.4; 62/126; 62/158; 62/323.1; 62/229; 165/26; 123/198 D
[58] Field of Search ............ 62/228.1, 228.2, 228.3, 62/228.4, 228.5, 229, 226, 227, 230, 207, 323.1, 196.2, 158, 126; 165/26; 236/1 EA, 1 E; 123/198 D

[56] References Cited

U.S. PATENT DOCUMENTS

| | | | |
|---|---|---|---|
| 1,981,859 | 11/1934 | Frese | 290/38 |
| 2,850,001 | 9/1958 | Jones | 123/179 |
| 2,887,853 | 5/1959 | Talmey | 62/228.4 X |
| 3,499,297 | 3/1970 | Ruff et al. | 62/228.4 X |
| 3,551,686 | 12/1970 | Koehler et al. | 290/38 |
| 3,691,393 | 9/1972 | Papachristou | 290/30 |
| 3,926,167 | 12/1975 | Camp | 123/179 L |
| 4,325,224 | 4/1982 | Howland | 62/196.2 |

Primary Examiner—Albert J. Makay
Assistant Examiner—Harry Tanner
Attorney, Agent, or Firm—E. C. Arenz

[57] ABSTRACT

A transport refrigeration unit powered by a two speed prime mover and having the capability of providing at least four modes of operation is controlled by an arrangement as shown in FIG. 2 which provides for operation in either a continuous cycle in which the prime mover runs continuously to provide the modes shown in FIG. 3 or, alternatively, operates in a start-stop cycle to provide the modes of operation shown in FIG. 4. The control in both of the cycles of operation provide for delays in the change of speed from low to high upon certain departures in temperature from one temperature band to another band which would normally call for high speed operation.

15 Claims, 5 Drawing Figures

TRANSPORT REFRIGERATION SYSTEM CONTROL

BACKGROUND OF THE INVENTION

Field of the Invention

The invention pertains to a control arrangement for a transport refrigeration system that has heating and cooling capabilities and a refrigerant compressor driven by an internal combustion engine having multiple speed capabilities.

My U.S. Pat. No. 4,325,224 describes and claims a transport refrigeration system control arrangement in which an electronic thermostat of the type available from the assignee of this application under the trademark "THERMO GUARD", is used in a control arrangement along with an auxiliary control relay and time delay means. The arrangement functions to keep the compressor operating at a lower speed for longer periods of time when the temperature in the served space is in the relatively close range of temperatures above and below a setpoint temperature. It overrides a call for operation of the compressor at a higher speed when the sensed, temperature in the space moves either above or below the relatively close range until at least a predetermined period of time has elapsed with an uninterrupted call for higher speed operation existing, and then the compressor operates at the higher speed. This arrangement, which is in commercial use, provides significant fuel economies in connection with a continuously operating internal combustion engine.

It is also known to provide transport refrigeration systems with an internal combustion engine driving the refrigerant compressor with a control arrangement which provides for automatic starting and stopping of the engine in accordance with temperature requirements of the served space.

U.S. Pat. No. 2,850,001 is a relatively old patent which speaks of a start-stop arrangement in connection with the type of transport refrigeration system then in use.

U.S. Pat. No. 3,926,167 states among its objects the provision of an automatic starting device for a diesel engine as well as to provide a control for a diesel refrigeration unit such that the engine will be started when the thermostat calls for cooling or heating, and then the engine will be turned off when the temperature requirement has been satisfied, to the end of minimizing running time of the engine and reducing use of engine fuel. The arrangement in this patent is such that a typical transport refrigeration control system is modified so that any low speed operation of the engine is eliminated and the system works on a start-stop cycle at high speed whether heating or cooling. The control arrangement does not provide for any optional continuous engine running cycle.

It is the overall aim of my invention to provide a control arrangement for a transport refrigeration system in which the user may elect to run the system in a continuous cycling mode or optionally may elect to operate it in a start-stop mode in which the engine operation is terminated when the served spaced temperature is in a range near setpoint. Additionally, the control arrangement is intended to be such that the operation of the engine at low speed is for all practical purposes maximized, and is available irrespective of whether the system is operating in a continuous mode or a start-stop mode.

In addition to the attainment of the foregoing objects, another object is to provide for a shutdown arrangement under starting malfunction conditions which shuts down all of the system except for that required to indicate a malfunction.

SUMMARY OF THE INVENTION

The invention finds its applicability in a transport refrigeration system of the type having the capabilities of at least heating and cooling operations, and dual compressor speed operations, with control means responsive to temperatures in the space served by the system for controlling the system in at least four modes of operation in accordance with temperatures in the served space differing from a setpoint temperature range, and in accordance with served spaced temperatures being in first and second temperature bands first above and next above, respectively, the setpoint temperature range, and in accordance with served space temperatures being in third and fourth temperature bands first below and next below, respectively, the setpoint temperature range.

In accordance with the invention and in a system of that type, the control means includes means for operating the system in either a continuous cycle with the compressor running continuously and, alternatively, in an automatic start-stop cycle in which the compressor is stopped when the served space temperature is in the third temperature band, with the control means further including means operative in the continuous cycle operation to delay for a predetermined time an increase in compressor speed from low to high upon a departure in served space temperature from either the third to fourth band or from the first to the second band, coupled with an uninterrupted call by the control means for the high speed, and operative in a start-stop cycle to stop the compressor when the served space temperature is in the third temperature band, and to effect any start of the compressor, occasioned by a departure of served space temperature from the third band, at said low speed.

Further in accordance with the invention, numerous features in the control arrangement are provided and will be described in some detail hereinafter.

DESCRIPTION OF THE PREFERRED EMBODIMENT

Figure 1:
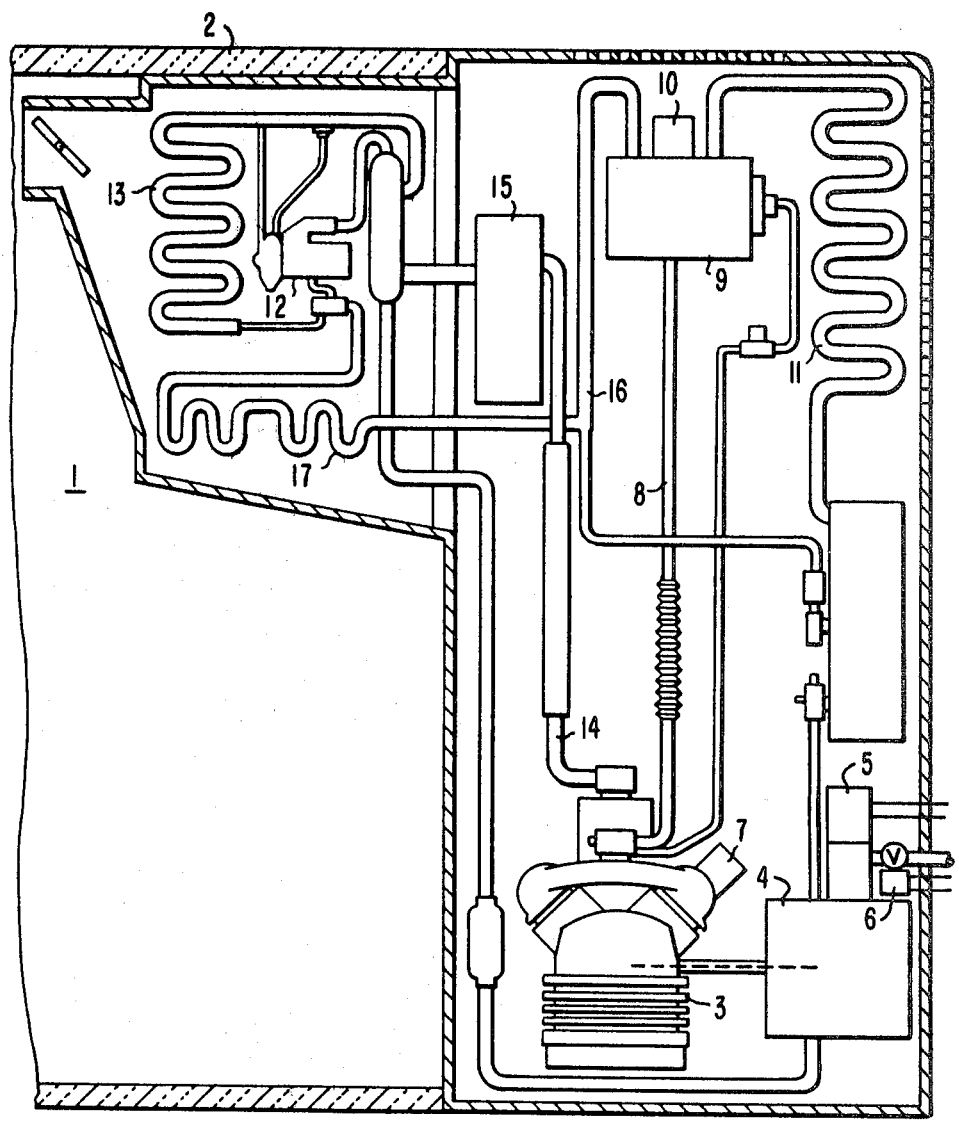
FIG. 1 is a schematic view of the main parts of a transport refrigeration system of one type to which the invention is applied for example.

Referring to FIG. 1 a transport refrigeration system of basically conventional parts is provided to serve the space 1 within an insulated trailer 2 or the like. Most of the main parts are shown in schematic form since the system shown is considered conventional for purposes of this application and has been available from the assignee of this application for some time.

A refrigerant compressor 3 is driven by a dual speed prime mover such as a dual speed diesel engine 4. For purposes of example, the diesel engine includes a throttle with an electrically operated solenoid 5 to obtain the two different speeds. The throttle is fed with fuel through a fuel shut-off valve controlled by a solenoid 6. The compressor may be of the type which is unloadable through operation of unloading means controlled by an unloading solenoid 7, for example, shown in connection with one of the cylinder heads of the compressor.

The compressor 3 discharges hot gas through line 8 to the three-way pilot valve 9 controlled by a solenoid 10 which controls whether the valve is in a heating or a cooling operation position. In a cooling operation, the hot gas is passed through the refrigerant condenser 11 where it is condensed and flows to the receiver and then through various lines and devices to an expansion valve 12, refrigerant evaporator 13 and back to the suction line 14 of the compressor through accumulator 15.

In both the heating and defrosting operations, the pilot solenoid is energized to move the valve to an opposite position so that the hot gas is discharged through line 16 to a defrost pan heater 17 and then through the evaporator 13 in the reverse direction relative to a cooling operation.

The means for providing air flow through the two sections of the refrigeration unit are not shown since they are readily known in the art. Basically, air from the served space 1 is drawn into the evaporator section and discharged back into the served space, while outdoor air is brought into the condenser section and passes therethrough back to ambient. The refrigeration system thus far described is well known in the art and is basically the same as that shown in my previously noted patent.

Figure 2A:
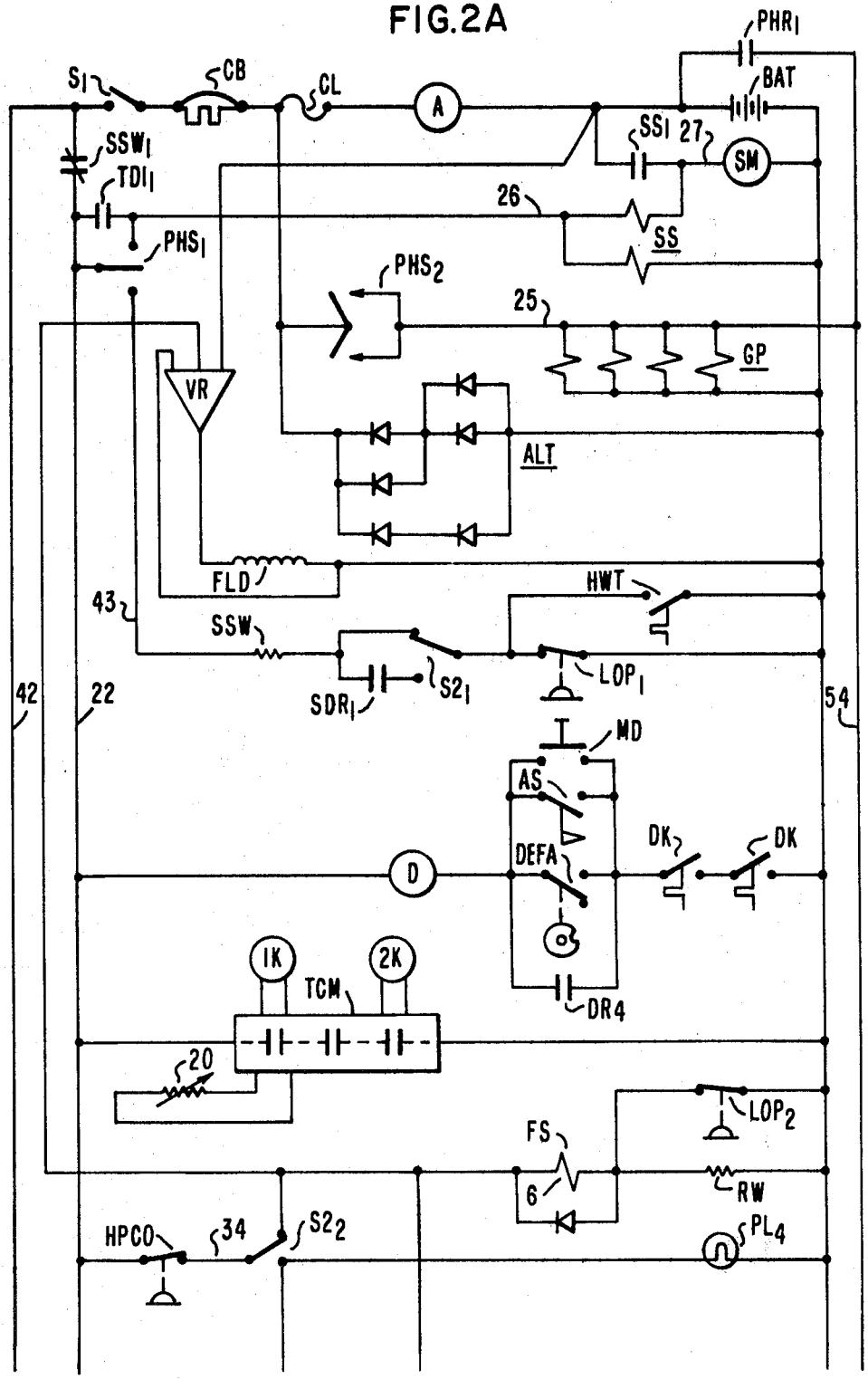
FIG. 2 is a schematic diagram, comprised of views 2A and 2B, of one form of control system according to the invention.
Figure 2B:
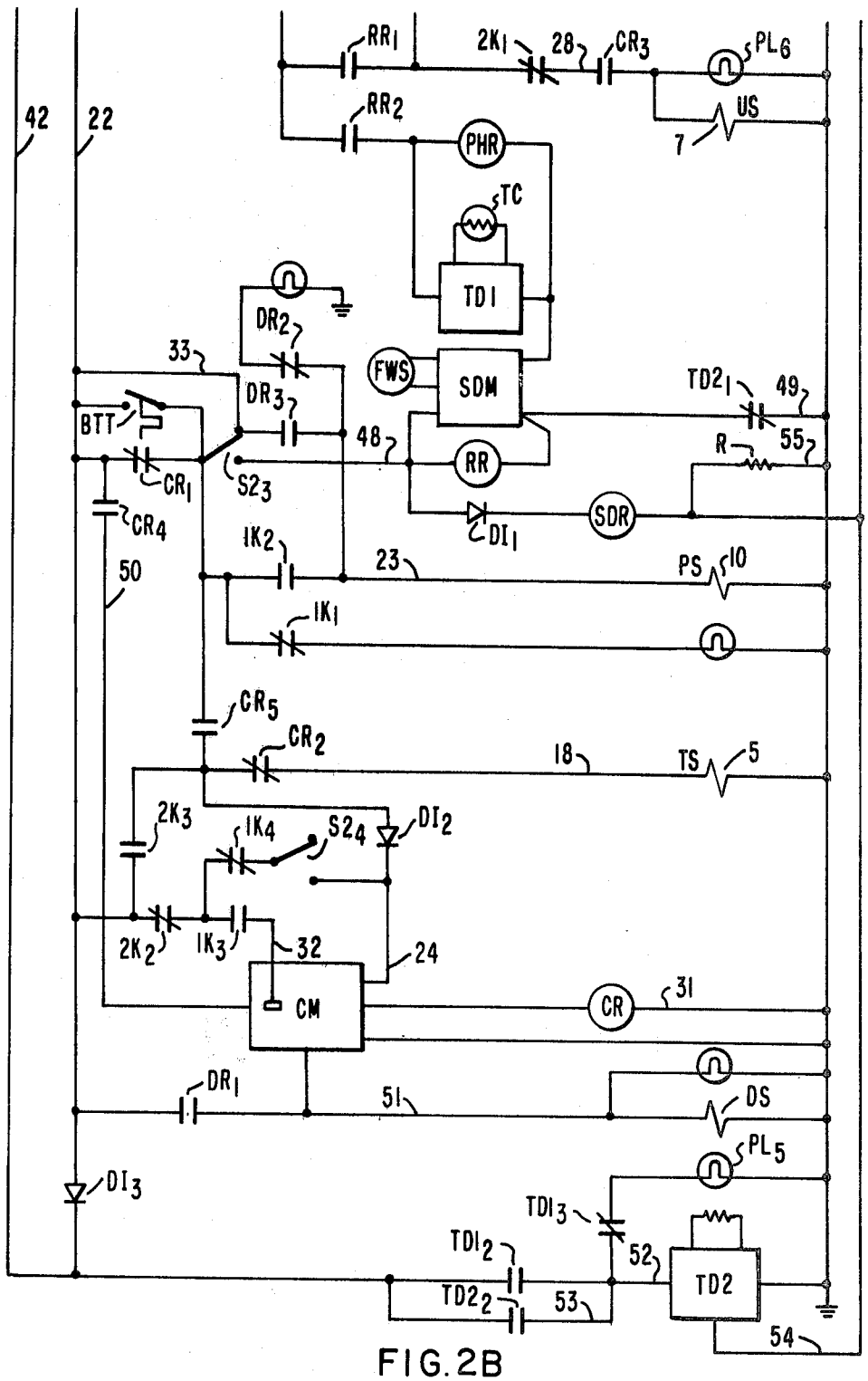

Referring to FIG. 2, a circuit arrangement for controlling the refrigeration system of FIG. 1 in accordance with the invention is shown. This circuit uses the same electronic thermostat as was described in my noted patent and is herein generally designated TCM. That thermostat is of conventional construction and available from applicant's assignee under the trademark identification "THERMO GUARD". Such a thermostat includes a sensor 20 for sensing the temperature in the served space 1, three switch means shown in dash lines in the thermostat and not separately identified, and a first and second relay 1K and 2K. These relays typically are called the heat relay and the speed relay, respectively, since in the conventional prior art system the switch means controlled by the relays control these two quantites mainly. Both of these relays control switch means which are located in various particular circuits and their controlled switches are identified by the prefixes 1K and 2K.

Another important aspect of the invention which functions not only in connection with a continuous cycle, but also in connection with an automatic start-stop cycle is the time delay which works to maintain the compressor speed at the low value to the extent possible. The main elements in this kind of operation are the auxiliary control relay CR which controls various switches with the identical prefix CR, and the auxiliary control module CM which includes internal switching not shown. The control module is available in one form as an FC119 timer of Syracuse Electronics Corporation, Syracuse, N.Y.

CONTINUOUS CYCLE

While the function of the elements in a continuous cycle operation is essentially the same as in my noted patent, the circuitry for accomplishing these functions is changed somewhat to accommodate the start-stop cycle operation as well, and accordingly it is considered desirable to provide a at least a general review of the operation in a continuous cycle.

Figure 3:
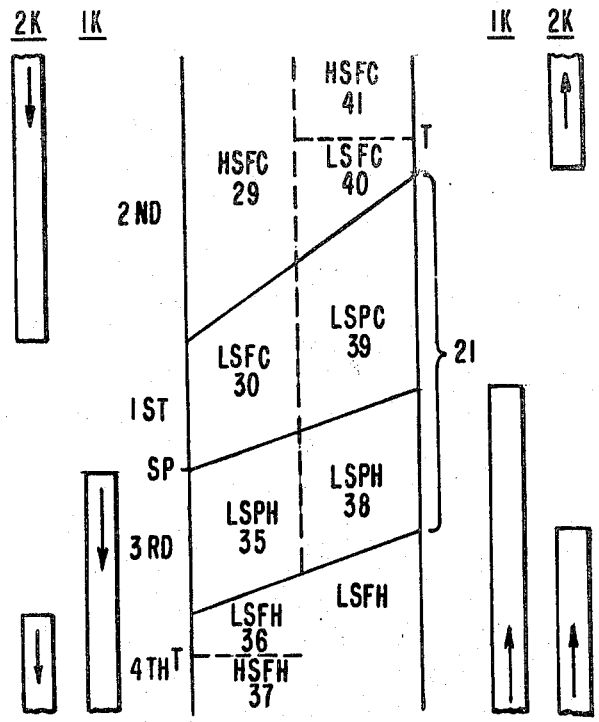
FIG. 3 is a representation of the temperature bands near the setpoint temperature range for a continuous cycle operation with indications of the relay switch conditions and the particular type of operation carried out by the refrigeration system in the various temperature bands.

It is believed that it will aid in quickly grasping the operation of the circuit and the sequencing of the Thermoguard relays in connection with the circuit by referring to FIG. 3, which is the representation which relates to the continuous cycle. The left side of the intermediate block corresponds to a sequence of descending temperatures from well above a setpoint temperature SP through the setpoint temperature range to a temperature well below the setpoint temperature range. The setpoint temperature range is indicated by the slanted line adjacent SP. The right side of the block corresponds to rising temperatures in the served space from well below to well above the setpoint temperature range. An intermediate temperature band encompassing the setpoint temperature range, and in which it is desirable to always have low speed compressor operation, is indicated by the bracket 21. As shown, the relay 2K is energized with temperatures in the served space above and below the intermediate band 21, while relay 1K is energized at temperatures in the served space below the setpoint temperature range. The setpoint temperature is referred to as a range as distinct from a specific value because of the usual differential associated with such control thermostats.

The abbreviations such as HSFC and so on are abbreviations for the mode of operation in the particular blocks of the central part of FIG. 3, and will become apparent as the description proceeds.

All relay control switches in FIG. 2 are shown in positions corresponding to the controlling relays being deenergized.

To operate in a continuous cycle mode, the main power switch S1 is closed and each of the switches of the ganged switch which determines whether the operation is to be continuous or automatic start-stop are each positioned for the continuous operation, as shown in FIG. 2. These ganged switches comprise $S2_1$, $S2_2$, $S2_3$ and $S2_4$. Switch $S2_1$ connects the safety switch heater SSW to the low oil pressure switch $LOP_1$ and the high water temperature switch HWT to enable the possibility of a shutdown in the event of a malfunction. Switch $S2_2$ connects the high pressure refrigerant cut-out switch HPCO to the fuel solenoid FS. Switch $S2_3$ disconnects control circuit power (available at line 22 with switch S1 closed) from the thermostat relay switches $1K_1$ and $1K_2$ and from line 23 in which is connected the pilot solenoid PS. Switch $S2_4$ disconnects the switch $1K_4$ from the timing initiate circuit line 24 for the control module CM.

To start the diesel engine, the ganged preheat start switches $PHS_1$ and $PHS_2$ are operated to their preheat positions to energize the preheat circuit 25 which includes the glow plugs GP. After the appropriate preheat time, the preheat-start switches are moved to positions to energize the line 26 including the starter solenoid SS which closes its controlled switch $SS_1$ and energize the cranking circuit 27 containing the starter motor SM.

Now assuming the temperature in the served space is well above the setpoint and the intermediate band 21 temperature, relay 2K will be energized for a high speed full cooling (HSFC) operation afforded by the circuit as follows. The loading circuit which includes line 28 will be deenergized by virtue of $CR_3$ being open, along with $2K_1$ also opening upon energization of 2K. The pilot circuit which includes the pilot solenoid PS in line 23 will be deenergized to provide for cooling instead of heating because $1K_2$ remains open in the absence of energization of relay 1K. The throttle circuit which includes throttle solenoid TS in line 18 will be energized to provide high speed engine and compressor operation with full cooling corresponding to the block 29 in FIG. 3.

As the served space temperature decreases to a level corresponding to the upper part of the temperature band 21, the 2K relay will be deenergized. While switch $2K_1$ closes in the loading circuit 28, switch $CR_3$ is still open so that the loading circuit remains deenergized with the compressor operating at full load. However, switch $2K_3$ opens and this results in deenergization of the speed or throttle circuit and the throttle solenoid TS so that the engine and compressor now operate at the lower speed. The pilot circuit 23 remains deenergized so that the three-way valve remains in a cooling position. The operation of the system is in the mode of low speed full cool (LSFC) corresponding to the block 30 in FIG. 3.

On a further reduction in temperature in the served space to the setpoint temperature range, relay 1K is energized while relay 2K remains deenergized. This brings into play control module CM and the auxiliary control relay CR in line 31. With switch $1K_3$ closing, the enabling circuit 32 to the CM is energized and this results in energization of the control relay CR through the internal circuitry in the control module. Switch $CR_2$ in speed circuit line 18 opens. The throttle solenoid TS remains deenergized and the engine operates at a lower speed. Power to the pilot solenoid PS to energize it for shifting the three-way valve to the heat position is available through closed switch $1K_2$ and selector switch $S2_3$ in the continuous cycle position and line 33 which connects to the power line 22. The unloader solenoid US is energized through the closed switch $CR_3$, the still closed switch 2K in the unloader circuit line 28, and through the high pressure cutout switch HPCO in line 34 and selector switch $S2_2$ in the continuous cycle position. The low speed part heat (LSPH) operating condition attained with the decreasing temperature is indicated by block 35 in FIG. 3.

From this operating condition, a number of changes of operating conditions can occur depending upon temperature changes and time. The time aspect turns on the operation of the control monitor CM which in turn controls the auxiliary control relay CR, the monitor having a built-in time delay and functioning generally as follows. When power is initially supplied to the monitor through the enabling circuit 32, it is passed to the control relay to energize it. So long as the relay 2K remains deenergized, and so long as no defrost operation is initiated, CR remains energized. However, if 2K is energized so that its switch $2K_3$ closes, an "initiate signal" is delivered through line 24 in the initiate circuit to the control monitor and a predetermined fixed time delay period begins. If the signal continues uninterruptedly for that period, such as eight minutes for example, then the control monitor operates to cut off power to the control relay. If, however, the signal is interrupted during the time period, the control monitor resets to zero time and requires another initiation signal for the time delay period to begin. This entire operation is the same as described in my noted patent in the continuous cycle mode of operation of this system. The time delay function attained through the control monitor and auxiliary control relay and circuitry associated therewith will operate to maintain the engine and compressor speed at the low level to the extent possible with the system. In a situation in which 2K is energized and remains energized until the time period expires, the system will switch to high speed, the time function being indicated by the dash lines with the letter T to the left and the right of the center part of FIG. 3.

The other operating modes in the continuous cycle and their identified areas in the center part in FIG. 3 are low speed full heat (LSFH) in area 36, high speed full heat (HSFH) in area 37; and with increasing temperatures in the served space, low speed part heat (LSPH) in area 38, low speed part cool (LSPC) in area 39, low speed full cool (LSFC) in area 40, and high speed full cool (HSFC) in area 41.

For purposes of this application, the blocks in FIG. 3 may be also considered as temperature bands in which the temperature of the served space differs from the setpoint temperature range. Thus, the blocks 30 and 39 comprise a first temperature band, first above the setpoint temperature range; the blocks 29, 40 and 41 comprise a second temperature band next above the setpoint temperature range, blocks 35 and 38 comprise a third temperature band first below the setpoint temperature range, and the blocks 36 and 37 comprise a fourth temperature band next below. The identity of these bands is indicated by the legends first, second, third and fourth to the left of the band.

It is noted that the second band is open-ended at the top, and the fourth band is open-ended at the bottom, so that temperatures above and below, respectively, the extent of shown will result in whatever operation is shown for the second and fourth bands.

It is believed unnecessary to further detail the specific operation of the circuit in the continuous cycle mode of operation as the temperature charges in different ways since such details are described in my noted patent along with the explanation of the system in a defrost mode of operation.

START-STOP CYCLE CIRCUITRY

Before proceeding with a description of how the circuit functions in the automatic start-stop cycle mode of operation, parts of the circuitry which are in addition to those shown in my noted patent application or which have a somewhat different function in this circuit, will be identified by their letter designations in FIG. 2 along with a very brief description of their basic functions. This will proceed with the letter designations in alphabetical order.

BTT is the block temperature thermostat which starts the engine in an exercise mode whenever the temperature reflecting the block temperature, preferably the coolant temperature, falls below the setting of the block temperature thermostat.

CM is the control module which is substantially the same as in the noted patent but which functions in a slightly different way in the start-stop cycle.

CR is the auxiliary control relay as in the noted patent but, similarly to the control module, provides slightly different functions in the start-stop cycle.

$DI_1$ is a diode for the shutdown relay SDR and prevents feedback from the glow plugs through the coil of the shutdown relay to the run relay RR.

$DI_2$ is a diode for the CM module which prevents feedback from selector switch $S2_4$ in the automatic position to the common junction of switches $CR_2$ and $CR_5$.

$DI_3$ is a diode for the auxiliary control circuit, line 42, and prevents the auxiliary control circuit from powering devices normally supplied by the standard control circuit line 22.

FWS is a flywheel sensor which senses flywheel rotation of at least a given speed by measuring the rate of passage of the flywheel ring gear teeth past the sensor.

PHR is a preheat relay which functions to energize the engine glow plugs as required by the start-up logic of the start-stop cycle.

PL4 is a pilot light which indicates that the automatic start-stop cycle control circuit has been enabled.

PL5 is a start-up malfunction indicator pilot light which indicates, when energized, that the unit did not complete the automatic start sequence and the sequence was terminated by secondary time delay means.

TL6 is a pilot light which indicates when energized, that the compressor unloader is energized for an operation with an unloaded condition of a compressor.

RR is a run relay which, when energized, provides power to the engine controls whenever the run signal is present in a start-stop cycle operation.

$S2_1$, $S2_2$, $S2_3$, and $S2_4$ is the manually operable selector switch which can be placed in either the continuous cycle operation position as described before or, alternatively, the start-stop cycle operation position.

SDR is the shutdown relay which enables the unit shutdown circuits whenever the run relay RR is energized, if the plugs GP are not energized.

SDM is the starter disconnect module to which the flywheel sensor signal is applied to disconnect the starter when the engine exceeds the cranking speed.

TC is a thermistor, preferably located in an engine coolant passage, and funtions to vary the time delay before which cranking starts based upon the coolant temperature.

TD1 is the primary time delay which functions to permit the energization of the starter only after the requisite preheat time of the glow plugs has elapsed.

TD2 is the secondary time delay and works to provide a backup shutdown of the entire system if a starting malfunction occurs in any of several ways. It has a first, shorter delay period of, say, 30 seconds, and a second, longer delay period of, say, 5 minutes, depending upon whether power is applied to it at one and another terminal.

START-STOP CYCLE OPERATION

With the manual selector switch S2 in the position opposite from that shown in FIG. 2, that is, in an automatic start-stop position, switch $S2_1$ disconnects the unit low oil pressure switch LOP and the high water temperature switch HWT, both of which are in the safety switch heater SSW circuit with line 33 to permit an engine start with low oil pressure existing. The function of SSW, of course, is to provide a unit shutdown through opening of switch $SSW_1$ after the heater SSW has been energized for a predetermined length of time. Switch $S2_2$ disconnects the refrigerant high pressure cutoff switch HPCO from the fuel control solenoid FS and connects the pilot light PL4 into the circuit to indicate the automatic cycle. Switch $S2_3$ disconnects control circuit power, available through line 33 connected to line 22, from the selector switch contacts $S2_3$ and connects together the common terminal of switches $IK_1$ and $IK_2$ a terminal of switch $CR_5$, and one side of the RR relay coil. Switch $S2_4$ connects a terminal of switch $IK_4$ to the initiate circuit 24 for the control module CM.

Figure 4:
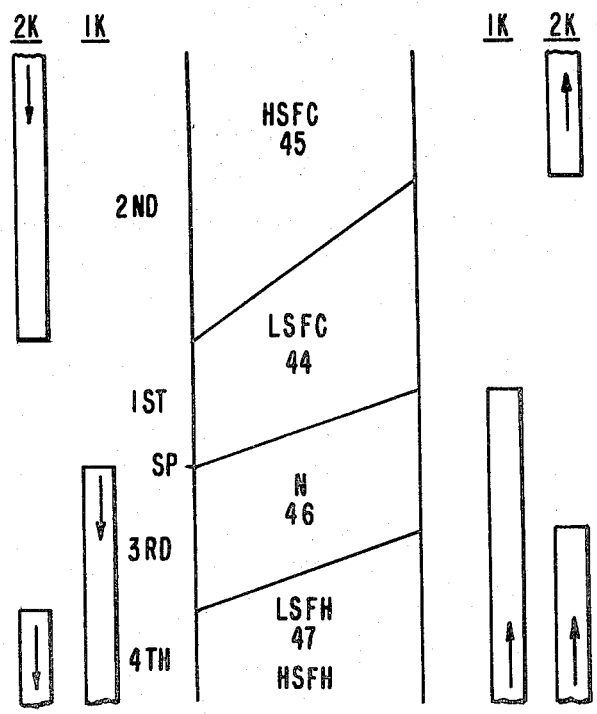
FIG. 4 is a representation as in FIG. 3 for the start-stop cycle operation and indicating the types of operation in the same temperature bands.

Before detailing the operation of the circuit of FIG. 2 with various temperature conditions existing, reference is made to FIG. 4 which includes the same four temperature bands, that is, the first through the fourth, but with somewhat different modes of operation available with the served space temperature in the bands because the system is in an automatic start-stop cycle. Thus, the first temperature band 44 above the setpoint temperature range will normally be a low speed full cool. The second, and next higher temperature band 45, will usually result in high speed full cool. The third temperature band 46 first below the setpoint temperature range is the band in which the engine will normally be stopped and is commonly called the null band. The fourth band 47, next below the null band, gives operation in either low speed full heat or high speed full heat in accordance with a time condition as controlled by the control module CM.

It will be assumed to start that the temperature in the served space is well above the setpoint temperature range so that it corresponds to being a temperature in the second band which calls for high speed full cool. Thus, thermostat relay 2K will be energized and 1K deenergized with the relay CR also being deenergized. The normally-closed switch CR1 will feed power from the main control line 22 through switch $S2_3$ in the automatic position and line 48 to the run relay RR, causing its controlled switches $RR_1$ and $RR_2$ to close. Preheat relay PHR is energized through switch $RR_2$ so that its controlled switch $PHR_1$ is closed, and power is also applied to the primary time delay TD1, with the coils of these two relays being grounded through the starter disconnect module SMD and closed switch $TD2_1$ in line 49. As soon as $PHR_1$ closes, the glow plugs GP are energized. As soon as power is applied to TD1, it starts timing with the length of the time delay before actuation being determined by the resistance of the thermistor TC which preferably is located in the engine coolant. Typical examples of the time delay before TD1 actuates to close its switch $TD1_1$ to energize the starter solenoid through line 26 are, say, 10 seconds for a coolant temperature of 120° F. (49° C.) and above, and about 2 minutes for a temperature of −20° F. (−29° C.). At the same time that switch $TD1_1$ closes to begin the cranking, switches $TD1_2$ and $TD1_3$ close and open, respectively, for purposes which will be explained later.

As soon as the engine starts the engine speed will exceed the setting of SDM which, through internal circuitry, will effectively turn off to open the circuit from PHR and TD1 to ground through line 49. SDM is a conventional device known in the art and is available as switch model number SLM 555 from Sterling Technology of Southfield, Michigan. With the ground for both PHR and TD1 lost, their controlled switches will operate to the positions shown in FIG. 2, while the run relay RR will remain energized through line 49 to ground. With the run relay remaining energized, the fuel solenoid FS remains energized through closed switch RR₁. The throttle solenoid TS is energized through line 18, closed CR₂ and closed 2K₃ so that the engine will run at high speed. The system will provide cooling since pilot solenoid PS is not energized because 1K₂ is open. It is noted that in the start-stop cycle, the unloading function of the compressor is not used so that the compressor will always be operating in a fully loaded condition with the circuitry shown in FIG. 2.

As the temperature in the served space drops from the second temperature band 45 into the first temperature band 44, relay 2K will be deenergized while relay 1K remains deenergized. Switch 2K₃ will open so that the throttle solenoid TS is deenergized and the engine drops to the lower speed. This condition of low speed full cool operation will continue until the temperature in the served space descends from the first temperature band into the third temperature band 46, the null or engine-off temperature band. The engine then automatically stops as relay 1K is energized. With switch 2K₂ remaining closed and switch 1K₃ closing, the enabling circuit 32 to the control module CM is completed and, accordingly, the relay CR is energized. When switch CR₄ in line 50 closes, it provides a latching circuit for CR. At the same time the normally-closed contacts of CR₁ open so that energization of the run relay RR is lost and the engine stops through opening of RR₁ in the line to the fuel solenoid FS. Essentially, all controls in the system except the thermostat control module TCM, and the control module CM are in a quiescent state so long as 1K and CR only are energized.

If it is assumed that the temperature of the served space rises back into the first temperature band 44 (FIG. 4), 1K is deenergized. This results in controlled switch 1K₄ closing and power is applied to CM through line 24 to initiate the timing cycle of the CM, which is typically about 8 minutes. When the timing cycle is complete, relay CR deenergizes. With switch CR₁ operating to its normally closed position, the run relay RR and associated start sequence circuitry are energized so that the system will now operate through the starting sequence, as previously described, except it will be at low speed since the throttle solenoid TS is not energized because switch 2K₃ remains open, and alternate power through switch CR₅ is not available since that switch is also open.

So long as both 1K and 2K remain deenergized, the engine will continue to run in low speed. If, however, the served space temperature continues to rise into the second temperature band 45, (FIG. 4), 2K of the TCM will be energized to bring in high speed cooling. This occurs through the closing of switch 2K₃, with switch CR₂ remaining closed in line 18 leading to the throttle solenoid TS. With a falling temperature in the served space back into the first temperature band, and then into the null band, the sequence of the operations will be as has been described before.

If the temperature in the served space drops below the third or null band into the fourth band 47, 2K is energized while 1K remains energized. The engine is started by energizing the run relay RR through a circuit including closed switch 2K₃, closed switch CR₅, the selector switch S2₃ and the line 48 to the run relay. The starting sequence is as described before. The engine starts at low speed, with the system providing heat since PS is energized, and concurrently timing of CM is initiated by applying power through the diode DI₂ in line 24. If the low speed full heat (LSFH) is adequate to bring the served space temperature back into the null band, before the CM times out, the system will revert back to the conditions described before in connection with a temperature in the null band. However, if the temperature fails to rise into the null band before the CM times out, the relay CR will be deenergized and the throttle solenoid TS energized through switch 2K₃ and CR₂ and line 18 so that the engine will run at high speed.

The engine will continue to run at high speed to provide high speed full heat HSFH until the served space temperature rises back into the null band. This deenergizes 2K and, with 1K remaining energized, the CM will again energize the relay CR so that the system is again in a null condition.

It will be noted in connection with the description of the changing circuitry conditions as the temperature in the served space moves from one temperature band to another, that the timing function enters into the manner in which the unit will operate. In other words, it is not simply a matter of whether 1K or 2K or both are energized or not, but rather what the time situation is as these various temperature conditions occur. The time situation is that which is provided by the control module CM and the relay CR under the control of the control module. The following is intended to give a short summary of the possible operations.

If the system is in the null band, and the temperature rises into the first band 44, the 8 minute timing starts but the engine does not start. If the temperature in the served space remains in the first band until the 8 minute timing expires, the engine will start in low speed cool. If the temperature has risen into the second band 45 before the 8 minutes has expired, the engine will start but it will start in low speed and will not proceed to the high speed until the timing has expired. This is considered advantageous in that the temperature in the served space may well drop back into the first band before the timing has expired.

If the temperature drops below the third or null band 46, the timing and the engine will start together, but with the engine operating at low speed until the timing expires, at which time it will switch to high speed. There is no possibility that the engine will continue to operate at low speed unless the temperature in the served space rises back into the null band before the timing expires. However, again it is advantageous that the engine starts at low speed since it may well be that the low speed heat will bring the served space temperature back into the null band.

While these changes in served space temperature have been described as if occurring naturally, the same kind of changes can occur from changing the setpoint temperature range. In other words, if the setpoint temperature is turned down a significant amount, this is as if the served space saw a demand for high speed cooling. It can of course also occur that with a temperature point set down a significant amount inadvertently, and then a correction of setting it back up several degrees, without the timing expiring, the system can see this as if it were a change in served space temperature. In every case in which the temperature departs from null, and there is an engine start, the start is at low speed. It is to be remembered that the purpose of the time delay is to keep the engine at low speed to see if the cooling or heating will be adequate to give the temperature change desired, and this is so whether the cycle is start-stop or continuous. Thus, the advantages of time delay for fuel economy are available whether in the continuous cycle or in the start-stop cycle.

There will be other conditions in which the served space temperature is in the null band, but it is desirable that the engine operate for some other purpose. One of these situations is when the block temperature of the engine, as sensed through the coolant temperature, falls below a certain minimum and it is desirable in the start-stop cycle that the engine be run to raise the coolant temperature. This is accomplished by the automatic closing of the BTT thermostat switch which parallels $CR_1$ switch and provides a direct connection through line 48 and selector switch $S2_3$ to the run relay RR for an engine start. The engine will start and run at low speed until the block temperature rises sufficiently to cause BTT to open. Initially, in this exercise mode of the engine, switch $1K_2$ in the pilot solenoid line will be closed and the operation which will occur will be heating. However, if this additional heat during the exercise mode causes the temperature in the served space to rise into the first band above the null band, the unit will switch to cooling through opening of switch $1K_2$ when the time period expires.

Another situation in which it may be necessary for the engine to run, although the served space temperature is in the null band, is when it is required to have a defrost in accordance with a frosted condition of the evaporator coil. The sequence in either a continuous cycle, or in the start-stop cycle when the served space temperature is not in the null band is essentially as described in my noted patent application. However, if the defrost is required when the served space temperature is in the null band, actuation of the defrost relay coil D through any initiation results in switch $DR_1$ closing and energizing line 51 which is connected both to the damper solenoid DS, and the control module CM at its terminate terminal. This causes the control relay CR to be deenergized so that the start sequence can be effected by the energization of the run relay RR through the closed switch $CR_1$.

START MALFUNCTIONS

As noted before, in the normal starting situation in a start-stop cycle, the energization of the run relay RR causes its controlled switches $RR_1$ and $RR_2$ to close to energize the preheat relay PHR, and apply initial power to TD1. TD1 of course has a time delay in accordance with the coolant temperature as sensed by TC and after this time delay the cranking starts with closure of $TD1_1$. When the coil of TD1 is energized after the time delay, its controlled switches $TD1_2$ closes and $TD1_3$ opens. This applies power from the auxiliary control circuit line 42 through closed switch $TD1_2$ and line 52 to the secondary time delay TD2. This starts a first time period running for the secondary time delay TD2. If the cranking does not result in the engine starting and, accordingly, the flywheel speed as sensed by FWS is insufficient to operate SDM to open the ground connection from PHR and TD1, it requires the opening of the switch $TD2_1$ in line 49 to disconnect the ground. TD2 provides a dual timing function and is selected so that this first period of time required before TD2 coil is energized after power is applied through line 52 is about 30 seconds. The run relay RR also loses its ground connection through opening of switch $TD2_1$ in line 49. At the same time that $TD2_1$ operates to an open position, $TD2_2$ in the latching circuit 53 closes so that energization of TD2 is maintained even though $TD1_2$ has opened with deenergization of TD1. At this point, with $PHR_1$ opening, the shutdown relay SDR is energized to ground through the glow plugs GP and its controlled switch $SDR_1$ closes. Thus the safety switch heater SSW is energized through the low oil pressure $LOP_1$ switch being closed due to the engine not running. After a predetermined time of heating by SSW, the safety switch $SSW_1$ is opened to remove power from the main control circuit line 22. However, power continues to be available through the main manual switch S1, the auxiliary control circuit line 42, the closed switch $TD2_2$ and latching circuit 53, and closed switch $TD1_3$ to the pilot light PL5 which indicates a malfunction. The circuit will remain in this condition with only the malfunction light and secondary time delay relay TD2 energized.

The failure of the engine to start after a first period of 30 seconds of cranking is one of the simpler malfunctions which occurs. There are other starting malfunctions for which the control means is designed in the event of failure of some of the components of the control circuit. A number of these types of failures will now be taken up.

Assume that in a normal type starting operation the module SDM fails closed and the engine starts. With SDM failing closed so that the ground for PHR and TD1 remains available, the cranking will continue and glow plug energization will continue for 30 seconds after the cranking has started. At this time, the secondary time delay relay TD2 will open switch $TD2_2$ in line 49 since TD2 will have had power applied to it for 30 seconds through switch $TD1_2$ in line 52. In the event the same type of failure occurs but the engine does not start for some reason, the same shutdown sequence will result. In both cases of course, the system circuit is shut down except for energization of the malfunction light PL5 and time delay TD2.

Another possible malfunction can occur in which the module SDM fails closed with respect to interruption of the ground circuit, and switch $TD1_2$ in the 30 second time delay line 52 to TD2 fails open. In this event, and regardless of whether the engine does or does not start, the cranking and the glow plug energization can continue for 5 minutes from the initial energization of the preheat relay PHR. This longer period before shutdown occurs through the application of power to relay TD2 through line 54 which is energized as soon as switch $PHR_1$ closes. The shutdown of course begins with opening of switch $TD2_1$ so that TD1 loses its ground, which terminates the cranking through opening of switch $TD1_1$, and also deenergizes the glow plugs through opening of switch $PHR_1$. Time delay TD2 coil remains energized through the latching circuit 53 containing switch $TD2_2$. The opening of main safety switch $SSW_1$ as a result of energization of shutdown relay SDR occurs as described before.

If only TD1 fails, there will be no cranking and no start and a 5 minute delay in deenergizing the glow plugs and energizing the malfunction light PL5.

If only TD2 fails, the engine will start normally and run without a shutdown.

In the above described situations in which there is a starting malfunction and the engine is stopped, it will be appreciated that the circuitry for the system is deenergized except for the secondary time delay and the malfunction light PL5. With the circuitry as described it would require that both the primary relay TD1 and the secondary relay TD2 would have to fail before failure to start would not disconnect the system circuitry.

The function of the shutdown relay SDR in shutting the circuit down upon a starting malfunction has been described. The SDR also comes into play if, after normal starting, there is a low oil pressure condition or a high water temperature condition as sensed by LOP1 and HWT, respectively. After a normal start, the SDR is energized from the same source as the run relay RR and grounds through line 54 and the glow plugs GP which are deenergized in a running condition. Thus switch SDR$_1$ is closed, and upon a loss of oil pressure, or a high water temperature, the safety switch heater SSW will be energized to produce a subsequent opening of switch SSW$_1$. Insofar as a condition could exist in which the ground would be unavailable through all of the glow plugs being open, a parallel line 55 to ground is provided. A resistor R of, say, 40 ohms is provided therein to limit current draw.

I claim:

1. In a transport refrigeration system of the type having the capabilities of at least heating and cooling operations, and dual compressor speed operation, and control means responsive to temperatures in the space served by the system for controlling the system in at least four modes of operation in accordance with temperatures in the served space differing from a setpoint temperature range, and in accordance with served space temperature being in first and second temperature bands first above the next above, respectively, the setpoint temperature range, and in accordance with served space temperatures being in third and fourth temperature bands first below and next below, respectively, the setpoint temperature range, the improvement comprising:
said control means includes means for operating the system in either a continuous cycle with said compressor running continuously and, alternatively, in an automatic start-stop cycle in which said compressor is stopped when the served space temperature is in said third temperature band;
said control means further including speed change delay means operative in said continuous cycle operation to delay for a predetermined time an increase in compressor speed from low to high upon a departure in served space temperatures from either the third to the fourth band, or from the first to the second band, coupled with an uninterrupted call by said control means for said high speed, and operative in a start-stop cycle, with said compressor stopped when the served space temperature is in said third temperature band, to effect any start of said compressor, occasioned by a departure of served space temperature from said third band, at said low speed.

2. In a transport refrigeration system according to claim 1, wherein:
said control means is operative in said start-stop cycle to delay the start of said compressor for said predetermined time upon a departure in served space temperature from the third to said first band, and to start said compressor and then to delay for said predetermined time an increase in compressor speed from low to high upon a departure of served space temperature from said third to either said second or said fourth band and coupled with an uninterrupted call by said control means for said high speed.

3. In a system according to claim 1 including:
a dual speed diesel engine for driving said compressor and having glow plugs;
an engine cranking circuit;
a glow plug energizing circuit; and
said control means includes engine starting control means operative in a start-stop cycle including:
starter time delay means operative to energize said cranking circuit, after glow plug energization for a period reflecting engine temperature;
means responsive to an engine speed of at least a given value indicating an engine start for normally effecting cranking termination and glow plug deenergization;
starting malfunction control means providing a system shutdown in one way, in the event of failure of said engine speed responsive means working normally, after one time period beginning with energization of said cranking circuit, and a system shutdown in another way, in the event of either failure of said engine speed responsive means working normally, and failure of said starting malfunction control means effecting a system shutdown in said one way, after a second and longer period beginning with energization of said glow plugs.

4. In a system according to claim 3 wherein:
said starter time delay means includes a primary time delay relay means having a first switch in said cranking circuit and a second controlled switch;
a preheat relay having a controlled switch in said glow plug energizing circuit;
engine start control circuit means including said preheat relay and the relay of said primary time delay relay means in parallel, and said speed responsive means in series therewith;
said starting malfunction control means includes a secondary time delay relay means having a first controlled switch in said start control circuit means in series with said speed responsive relay means and operable upon actuation of said secondary time delay relay means to open said start control circuit means to thereby deenergize both said preheat relay and said primary time delay relay means.

5. In a system according to claim 4 including:
a first energizing circuit for said secondary time delay relay means including said second switch of said primary time delay relay means for energizing said secondary time delay relay means for a delay for said one time period;
a second energizing circuit for said secondary time delay relay means including said preheat relay controlled switch for energizing said secondary time delay relay means for a delay for said second and longer period.

6. In a system according to claim 5 wherein:
said secondary time delay relay means includes a second controlled switch operable upon actuation of said secondary time delay relay means for energizing a malfunction indication circuit, said malfunction indication circuit includes said second switch of said primary time delay relay means in a condition corresponding to said primary time delay relay means being deenergized.

7. In a system according to claim 4 including:
a run relay connected in series to said first controlled switch of said secondary time delay relay means, said run relay including a first controlled switch in series in said engine start control circuit, and a second controlled switch in series with a fuel valve solenoid for said engine.

8. In a system according to claim 7 including:

normally open switch means, operable to a closed position in response to a temperature reflecting engine block temperature below a given level to energize said run relay to effect an engine start for operation in an exercise mode.

9. In a system according to claim 1 including:
unloading means for said compressor; and
means for controlling operation of said unloading means permitting operation of said compressor in an unloaded condition during said continuous cycle only.

10. In the method of operation of a transport refrigeration system which has high and low speed diesel engine driven compressor operation, and both heating and cooling capabilities, and in which the system provides at least high speed cooling, low speed cooling, low speed heat, and high speed heat modes of operation corresponding to the temperatures of the served space being in ranges well above, next above, next below, and well below, respectively, the set point temperature for the system, the improved method of operation comprising:
operating said system with said engine running continuously to provide at least the modes of operation as listed in the preamble hereto; and
alternatively, operating said system with said engine operating in an automatic start-stop cycle in which said engine is stopped as the temperature in said served space either descends down into or rises up into said temperature range next below said set point temperature, and said engine is started again upon a predetermined departure in served space temperature from said temperature range next below said set point temperature.

11. In the method of claim 10 and with the system in said automatic start-stop cycle, including:
starting said engine at said low speed under all conditions of a departure in served space temperature from said temperature range next below said set point temperature, and said served space temperature remaining outside of said temperature range next below.

12. In the method of claim 10 and with the system in said automatic start-stop cycle, including:
delaying starting said engine for a predetermined time upon said served space temperature departing from said temperature range next below said set point temperature and rising into said temperature range next above said set point temperature and remaining in said last named temperature range for said predetermined time.

13. In the method of claim 10 and with the system in said automatic start-stop cycle, including:
starting said engine at said low speed upon said served space temperature dropping from said temperature range next below said set point temperature into said temperature range well below said set point temperature, and after said predetermined time with said served space temperature remaining in said temperature range well below said set point temperature, increasing the engine speed to high.

14. In the method of claim 10 and with the system in said automatic start-stop cycle, including:
starting said engine at low speed upon a rise in served space temperature into said temperature range well above said set point range and after said predetermined time with said served space temperature remaining in said temperature range well above said set point temperature, increasing the engine speed to high.

15. In the method of claim 10 and with the system in said automatic start-stop cycle, including:
in the event of starting failure, shutting said system down after one predetermined time following engine start failure and a system shut down failure in one way, and shutting said system down in another way after a longer, second predetermined time following engine start failure and a failure of said system shut down in said one way.

* * * * *